United States Patent [19]

Aschwanden et al.

[11] Patent Number: 4,907,116
[45] Date of Patent: Mar. 6, 1990

[54] POWER SUPPLY FAULT PROTECTION CIRCUIT

[75] Inventors: Felix Aschwanden, Thalwil; Theodor E. Bart, Kindhausen; Peter E. Haferl, Adliswil, all of Switzerland

[73] Assignee: RCA Licensing Corporation, Princeton, N.J.

[21] Appl. No.: 204,474

[22] Filed: Jun. 9, 1988

[51] Int. Cl.$^4$ ............................................... H02H 7/10
[52] U.S. Cl. ........................................ 361/18; 363/56
[58] Field of Search ............... 361/18, 96, 79, 87, 361/57; 363/19, 21, 23, 25, 56; 258/411

[56] References Cited

U.S. PATENT DOCUMENTS

| | | | |
|---|---|---|---|
| 2,980,843 | 9/1957 | Conger | 361/18 X |
| 3,968,421 | 7/1976 | Marcade | 361/18 X |
| 4,005,351 | 1/1977 | Blum | 363/56 |
| 4,020,816 | 5/1977 | Chateau | 361/18 X |
| 4,048,552 | 9/1977 | Stone | 363/25 |
| 4,104,714 | 8/1978 | Smith et al. | 363/21 |
| 4,150,426 | 4/1979 | Jansson | 363/25 X |
| 4,178,619 | 12/1979 | Seiler et al. | 361/18 X |
| 4,307,441 | 12/1981 | Bello | 363/25 |
| 4,318,168 | 3/1982 | Faxon | 361/18 X |
| 4,363,068 | 12/1982 | Burns . | |
| 4,422,132 | 12/1983 | Kornrumpf | 363/56 X |
| 4,423,457 | 12/1983 | Brajder . | |
| 4,429,339 | 1/1984 | Jaeschke et al. . | |
| 4,451,778 | 5/1984 | Fischer et al. | 361/18 X |
| 4,620,258 | 10/1986 | Bloomer . | |
| 4,656,399 | 4/1987 | Testin et al. . | |
| 4,745,513 | 5/1988 | McMurray | 361/56 |
| 4,761,812 | 8/1988 | Hollis et al. | 363/21 X |

Primary Examiner—William M. Shoop, Jr.
Assistant Examiner—A. Jonathan Wysocki
Attorney, Agent, or Firm—Joseph S. Tripoli; Joseph J. Laks; Sammy S. Henig

[57] ABSTRACT

A MOSFET power switching transistor in a DC-to-DC converter of a television apparatus has a drain electrode that is coupled via a primary winding of a chopper transformer to an input supply voltage. A first signal at a given frequency causes, during normal operation, alternate conduction and nonconduction in the transistor. A second signal is generated that is proportional to the voltage developed across the internal "on" resistance of the transistor when the transistor is conductive. The second signal is clamped when the MOSFET transistor is nonconductive. The second signal is coupled via a current sensing arrangement to the transistor gate. The second signal prevents the transistor from further conducting when the amplitude of the second signal exceeds a predetermined value that corresponds with a predetermined limiting threshold level of current in the transistor.

21 Claims, 3 Drawing Sheets

FIG. 5

POWER SUPPLY FAULT PROTECTION CIRCUIT

The invention relates to a fault protection circuit in a power supply of, for example, a television apparatus and, in particular, to one that prevents an over-current condition in a power MOSFET transistor.

A DC-to-DC converter, or chopper, used in, for example, a television apparatus power supply, may utilize a switching power transistor operating at a given frequency and having a first main current conducting electrode that is coupled to a first terminal of a primary winding of a transformer. A second terminal of the primary winding may be coupled to an input, DC voltage that may be obtained from a battery or from a bridge rectifier that rectifies an AC mains voltage. When the transistor is switched off, a voltage is induced in a secondary winding of the transformer. The induced voltage in the secondary winding is rectified for producing an output DC voltage that energizes a load circuit. The load circuit may be, for example, a deflection circuit of a television receiver.

It may be desirable to protect the power transistor against an over-current condition that may be destructive. Such over-current condition may be caused by, for example, an excessive loading condition in the secondary winding of the transformer.

In one prior art television circuit, a current level sampling resistor is coupled in series with the main current conducting electrodes of the power transistor. A voltage that is representative of the current flowing between the main current conducting electrode is developed across the sampling resistor. A comparator responsive to the voltage across the sampling resistor generates an output signal when an over-current condition occurs. The over-current condition occurs when the current in the power transistor exceeds a predetermined threshold level that is considered a safe operating level. The comparator output signal is coupled to a drive circuitry of the power transistor to turn off the power transistor, thus preventing further conduction in the power transistor when the over-current condition is detected.

In high current applications, such sampling resistor, disadvantageously, may dissipate considerable power; hence, the efficiency of the converter is reduced. Therefore, it may be desirable to sense the current in the power transistor without interposing such sampling resistor in series with the power transistor.

In a circuit embodying a feature of the invention, the power transistor is, for example, of the MOSFET type. The source electrode is grounded and the drain electrode is coupled to the primary winding of the aforementioned transformer. The voltage that is developed between the drain electrode and ground is proportional to the current in the MOSFET transistor during its conduction. Therefore, such voltage is indicative of the level of the current that flows in the MOSFET transistor during the conduction time. Such voltage is used for generating an over-current protection signal, embodying an aspect of the invention.

On the other hand, the voltage between the drain electrode and ground, when it is nonconductive, may be substantially higher and may not be indicative of the current that flows during the conduction time of the MOSFET transistor. It may be desirable to prevent that voltage from affecting the over-current protection signal.

In accordance with an aspect of the invention, the voltage that is developed at, for example, the drain electrode, is used for generating a first portion of a first signal, embodying a feature of the invention. The voltage at the drain electrode may be referred to as the voltage that is developed across the "on" resistance of the MOSFET transistor. When the MOSFET transistor is conductive, the level of the first portion of the first signal varies proportionally as the voltage at the drain electrode. The level of the first portion of the first signal is indicative of the current in the transistor. When the MOSFET is nonconductive, a second portion of the first signal is established at, or clamped to a constant level such as, for example, zero volts. In this way, an amplitude of the first signal is, advantageously, indicative of the current in the transistor but is unaffected by the voltage at the drain electrode when the transistor is nonconductive.

The first signal is coupled to a current sensing arrangement that may include a comparator. When a magnitude of the first signal exceeds a predetermined level, indicative of an over-current condition, the current sensing arrangement generates a control signal that is coupled to the gate electrode of the MOSFET transistor, causing the MOSFET transistor to turn off. In this way, the MOSFET transistor is, advantageously, protected against a potentially destructive over-current condition. In one embodiment of the invention, a second transistor is used for clamping the first signal to the zero volt level when the MOSFET power switch is nonconductive.

A fault detection and protection apparatus, embodying an aspect of the invention, in a switching power supply includes a source of an input supply voltage and a first switching power transistor having first and second main current conduction electrodes and a control electrode. The apparatus includes a source of a first control signal at a given frequency that is coupled to the control electrode of the first switching power transistor. The first control signal causes, during normal operation, the first switching transistor to operate at a switching frequency determined in accordance with the given frequency. A utilization circuit of the apparatus includes an impedance coupled to the input supply voltage and to the first main current conducting electrode for developing an output supply voltage in the utilization circuit. The impedance forms a current path to a switched main current that flows in the first switching power transistor. A first current sensing signal is developed at a frequency determined in accordance with the given frequency between the first and second main current conducting electrodes of the first switching power transistor when the first switching power transistor is conductive. The first current sensing signal is indicative of a level of the main current when the first switching power transistor is conductive. A first portion of a second current sensing signal that is indicative of the level of the main current is generated at an output terminal, in accordance with the first control signal and in accordance with the first current sensing signal, when the first switching power transistor is at a conductive state. The output terminal is decoupled from the power transistor when the first switching power transistor is at a nonconductive state to prevent a voltage that is developed at the first main current conducting electrode of the first switching power transistor when the power transistor is nonconductive, from having a substantial contribution to an amplitude of the second current sensing signal. A second control signal is generated when a magnitude of the first portion of the second current sensing signal is outside a normal operation range, indicating an occurrence of a fault condition in the power supply. The second control signal is coupled to the control electrode of the first switching power transistor for preventing the first switching power transistor from further conducting.

Figure 1:
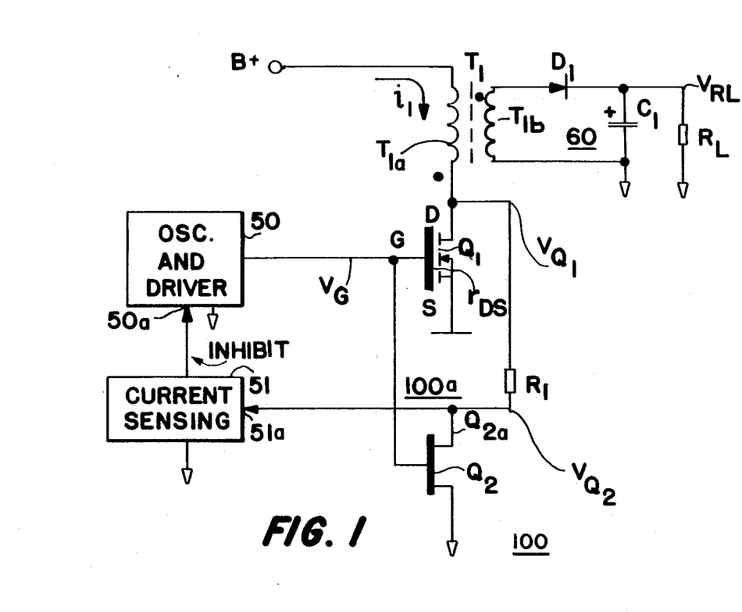
FIG. 1 illustrates a first embodiment of an over-current protection circuit, embodying an aspect of the invention.

FIG. 1 illustrates a DC-to-DC converter, or chopper arrangement 100 of a television apparatus that includes an over-current protection arrangement 100a, embodying an aspect of the invention. FIGS. 2a–2d illustrate waveforms useful for explaining the operation of arrangement 100 of FIG. 1. Similar numbers and symbols in FIGS. 1 and 2a–2d indicate similar items or functions.

Figure 2:
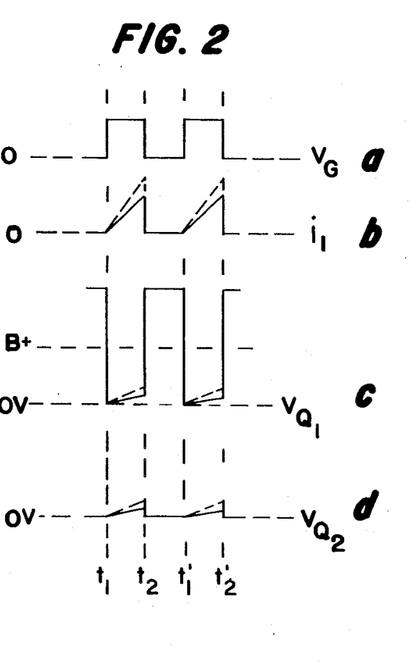
FIGS. 2a–2d illustrate waveforms useful in explaining the operation of the circuit of FIG. 1.

Arrangement 100 of FIG. 1 includes an oscillator and driver stage 50 that generates a square wave signal $V_G$ at a given frequency during normal operation, as shown in FIG. 2a. During normal operation, signal $V_G$ of FIG. 1 causes a MOSFET transistor $Q_1$ to switch on and off, alternately, at the switching frequency rate that is determined by that of signal $V_G$. A primary winding $T_{1a}$ of a chopper transformer $T_1$ has a first terminal that is coupled to a drain electrode of transistor $Q_1$ and a second terminal that is coupled to a DC input voltage B+. The switching operation of transistor $Q_1$ causes a voltage to be induced in a secondary winding $T_{1b}$ of transformer $T_1$ that is rectified by a rectifier arrangement 60 comprising a diode $D_1$ and a capacitor $C_1$. Rectifier arrangement 60 produces a DC output voltage $V_{RL}$ across a load, such as a resistor $R_L$. Resistor $R_L$ is representative of the load formed by a circuitry of the television apparatus, not further illustrated in FIG. 1, that is energized by voltage $V_{RL}$.

As a result of the conduction of transistor $Q_1$, a ramping current $i_1$ flows in winding $T_{1a}$, as shown in FIG. 2b. The dashed lines in FIGS. 2b–2d correspond to a first example in which current $i_1$ is larger than in a second example, shown by solid lines.

During, for example, interval $t_1-t_2$ of FIG. 2c, current $i_1$ of FIG. 1 develops an upramping voltage $V_{Q1}$ at the drain of transistor $Q_1$ that is proportional to current $i_1$. Voltage $V_{Q1}$ is equal to the magnitude of current $i_1$ multiplied by $r_{DS}$, where $r_{DS}$ denotes the value of the "on" resistance of transistor $Q_1$ when transistor $Q_1$ is fully turned-on. When transistor $Q_1$ is nonconductive, such as during interval $t_2-t_1'$ of FIG. 2c, voltage $V_{Q1}$ of FIG. 1 is, as a result of transformer operation of transformer $T_1$, more positive than voltage B+. During interval $t_1-t_2$, for example, voltage $V_{Q1}$ of FIG. 2c is indicative of the magnitude of current $i_1$ of FIG. 1. During interval $t_2-t_1'$ of FIG. 2c, voltage $V_{Q1}$ includes a portion that is not readily representative of current $i_1$ in transistor $Q_1$ of FIG. 1.

In accordance with an aspect of the invention, a current sensing signal $V_{Q2}$ is generated from voltage $V_{Q1}$ that is proportional to current $i_1$ when transistor $Q_1$ is conductive and that is, for example, zero when transistor $Q_1$ is nonconductive. Therefore, signal $V_{Q2}$ is, advantageously, unaffected by voltage $V_{Q1}$ during the "off" time of transistor Q1. In this way, an amplitude of signal $V_{Q2}$, such as, for example, its peak-to-peak amplitude, is proportional to current $i_1$ that occurs during the "on" time of transistor Q1. Such feature of signal $V_{Q2}$ is advantageous in that it simplifies further processing of signal $V_{Q2}$ because signal $V_{Q2}$ is unaffected by voltage $V_{Q1}$ when transistor $Q_1$ is nonconductive. Such processing of signal $V_{Q2}$ may include, for example, low-pass filtering signal $V_{Q2}$ to reduce noise or averaging signal $V_{Q2}$ to form a signal that is indicative of the average value or of the peak value of current $i_1$ of FIG. 1.

To generate signal $V_{Q2}$, the drain electrode of transistor $Q_1$ is coupled through a resistor $R_1$ to a drain electrode $Q_{2a}$ of a JFET transistor $Q_2$ operating as a shunt switch. The gate electrode of transistor $Q_2$ is coupled to signal $V_G$. Transistors $Q_1$ and $Q_2$ operate in a complementary manner; when one is conductive, the other is not, and vice versa.

Signal $V_{Q2}$, embodying an aspect of the invention and developed at electrode $Q_{2a}$, as shown in FIG. 2d, is equal, during interval $t_1-t_2$, to voltage $V_{Q1}$ of FIG. 2c. During interval $t_2-t_1'$, for example, that occurs when transistor $Q_1$ is nonconductive, voltage $V_{Q1}$ may not be readily representative of current $i_1$ of FIG. 1. During interval $t_2-t_1'$, signal $V_{Q2}$ of FIG. 2d is clamped to approximately zero volts by the "on" resistance of conductive JFET transistor $Q_2$ of FIG. 1. Therefore, the contribution of voltage $V_{Q1}$ to signal $V_{Q2}$ when transistor $Q_1$ is conductive is substantially bigger than when transistor $Q_1$ is nonconductive. Therefore, advantageously, a change in current $i_1$ will cause, proportionally, a larger change in, for example, the peak amplitude or the average of signal $V_{Q2}$ than if signal $V_{Q2}$ were not so clamped. The result is an over-current detection arrangement that is sensitive to variations in current $i_1$. It should be understood that resistor $R_1$ and transistor $Q_2$ form a controllable attenuator having a very high or infinite attenuation factor that attenuates mainly when transistor $Q_1$ is nonconductive and that couples, for example, unattenuated voltage $V_{Q1}$ to form signal $V_{Q2}$, when transistor $Q_1$ is conductive.

Advantageously, signal $V_{Q2}$ of FIG. 2d is an analog signal. As an analog signal, signal $V_{Q2}$ is capable of assuming any value from a range including infinite distinct values when current $i_1$ assumes any value from a corresponding range of values. In contrast, a digital signal may assume only a finite numbers of values. Being an analog signal, signal $V_{Q2}$ of FIG. 1 may be, advantageously, readily low-pass filtered in a conventional low-pass filter for obtaining a filtered current sensing signal, not shown in the FIGURES, that is coupled to current sensing arrangement 51. Note that if voltage $V_{Q1}$ were low-pass filtered directly, its amplitude would not be readily representative of current $i_1$. This is so, because the portion of voltage $V_{Q1}$ when transistor Q1 is nonconductive may not be necessarily related to current $i_1$ in magnitude. Such portion may be much larger than the other portion of voltage $V_{Q1}$ when transistor $Q_1$ is conductive that makes the process of extracting information of current $i_1$ more difficult.

Signal $V_{Q2}$ is coupled to an input terminal 51a of current sensing arrangement 51 that may include the aforementioned low-pass filter. An over-current condition may occur when current $i_1$ of FIG. 2b exceeds a predetermined level that is considered a safe operating level. When such over-current condition occurs, the peak or the average value signal $V_{Q2}$ becomes larger than a corresponding predetermined reference voltage level. Consequently, current sensing arrangement 51 of FIG. 1 that may include a comparator generates an over current protection signal INHIBIT that is coupled to a control terminal 50a of oscillator and driver 50. Signal INHIBIT causes signal $V_G$ to be maintained at, for example, zero volts that forces transistor $Q_1$ to remain nonconductive. Current $i_1$ of FIG. 1 becomes zero, thereby protecting transistor $Q_1$ from the aforementioned over-current condition. The clamping operation of transistor $Q_2$, advantageously, simplifies the manner by which information regarding the magnitude of current $i_1$ is obtained from voltage $V_{Q1}$ for producing signal INHIBIT.

Figure 3:
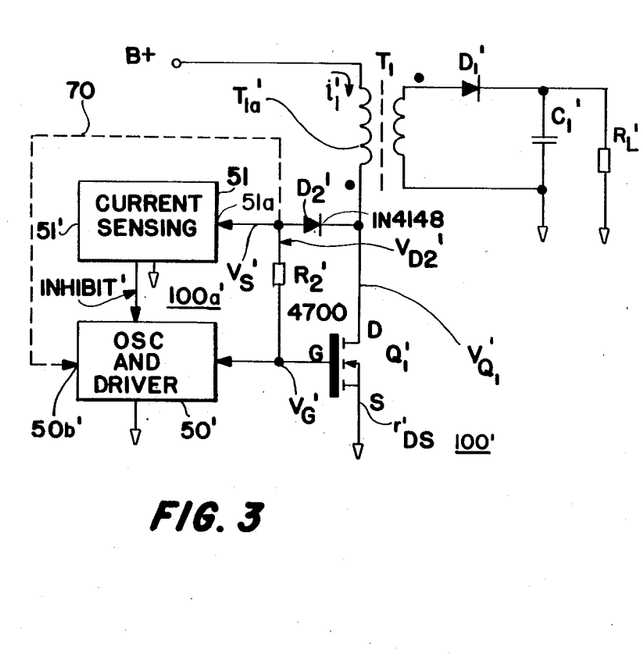
FIG. 3 illustrates a second embodiment of an over-current protection circuit, embodying another aspect of the invention.

FIG. 3 illustrates a power supply arrangement 100', embodying another aspect of the invention, that is similar to arrangement 100 of FIG. 1. In particular, the magnitude of the current in each MOSFET transistor, $Q_1$ and $Q_1'$ of FIGS. 1 and 3, respectively, is obtained from a voltage that is developed between the corresponding drain and source electrodes when the respective transistor is turned on. Similar numbers and symbols in FIGS. 1 and 3 indicate similar items or functions.

A signal $V_S'$ of FIG. 3 that is analogous to signal $V_{Q2}$ of FIG. 1 contains information of the magnitude of a current $i_1'$. FIGS. 4a–4d illustrate waveforms useful for explaining the operation of arrangement 100' of FIG. 3. Similar numbers and symbols in FIGS. 3 and 4a–4d indicate similar items or functions.

In arrangement 100' of FIG. 3, a signal $V_G'$ that controls the switching operation of transistor $Q_1'$ is coupled to an anode electrode of a diode $D_2'$ via a resistor $R_2'$. Diode $D_2'$, operating as a series coupled switch, has a cathode electrode that is coupled to the drain electrode of transistor $Q_1'$. Signal $V_G'$ supplies a small forward biasing current through diode $D_2'$ at the same time that signal $V_G'$ causes transistor $Q_1'$ to turn on. Consequently, signal $V_S'$ is proportional to current $i_1'$. Signal $V_S'$ is developed at a terminal 51a' that is coupled at a junction between resistor $R_2'$ and the anode of diode $D_1'$. Signal $V_S'$ is equal, during interval $t_a-t_b$ of FIG. 4d, to the magnitude of current $i_1'$ multiplied by resistance $r_{DS}'$ plus the level of voltage $V_{D2}'$. Voltage $V_{D2}'$ is the forward voltage drop across diode $D_2'$ of FIG. 3 that is approximately equal to 0.7 volts.

Figure 4:
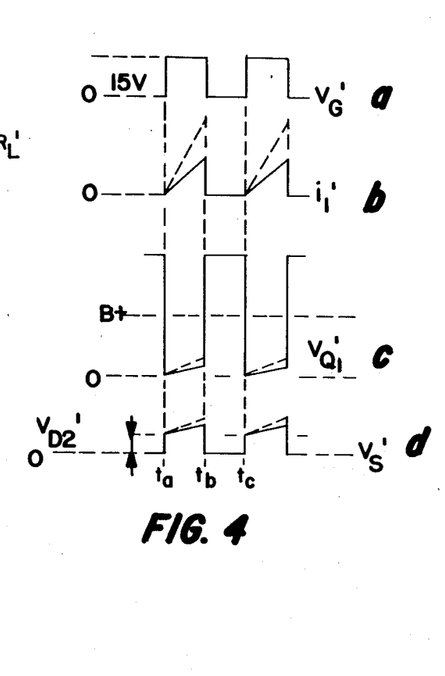
FIGS. 4a–4d illustrate waveforms useful for explaining the operation of the circuit of FIG. 3.

When signal $V_G'$ is zero, such as, for example, during interval $t_b-t_c$ of FIG. 4a, occuring when transistor $Q_1$ is nonconductive, the current in resistor $R_2'$ of FIG. 3 is zero. Therefore, the nonconductive diode $D_2'$ advantageously, isolates input terminal 51a' from voltage $V_{Q1}'$. When diode $D_2$ is nonconductive, voltage $V_{Q1}$ is higher than voltage B+. Thus, during, for example, interval $t_b-t_c$ of FIG. 4d, signal $V_S'$ is maintained at zero volts.

When signal $V_G'$ of FIG. 3, due to some fault condition, is too small, or when the magnitude of current $i_1'$ is excessive, protection signal INHIBIT' of current sensing arrangement 51' is generated. Signal INHIBIT', advantageously, prevents transistor $Q_1'$ from being turned on.

In some switch mode power supply applications it may be desirable to increase the frequency of signal $V_G'$ when current $i_1'$ increases so as to increase the range of regulation of the DC output voltage in the face of corresponding variations in current $i_1$ and in voltage B+. Advantageously, signal $V_s'$ may also be coupled, as shown in FIG. 3 by a dashed line, to a frequency controlling terminal 50b' of oscillator and driver 50' to increase, for example, the frequency of signal $V_G'$ when the magnitude current $i_1'$ increases, and vice versa.

Figure 5:
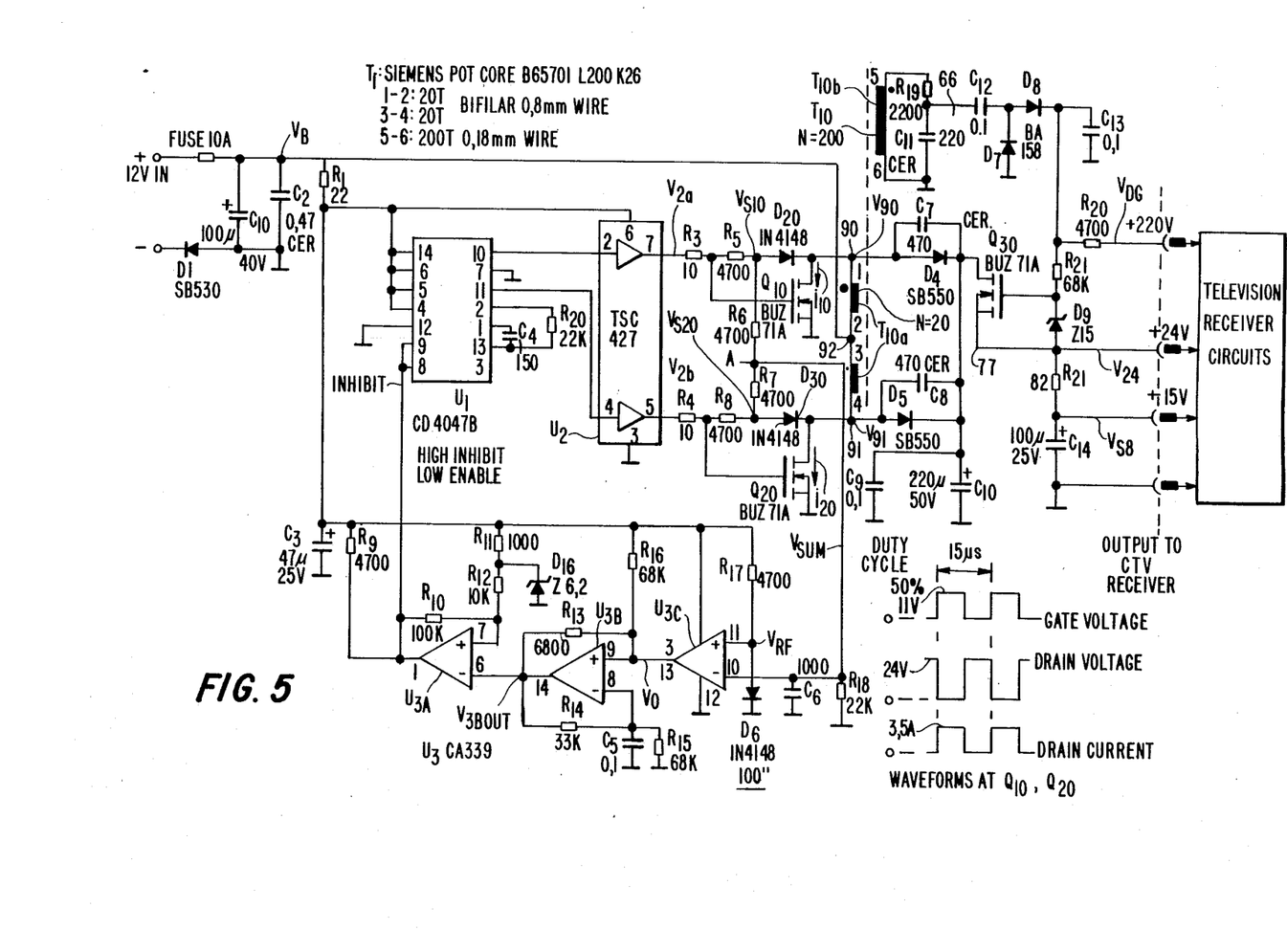
FIG. 5 illustrates a third embodiment of an over-current protection circuit embodying a further aspect of the invention that is utilized in a push-pull output stage.

FIG. 5 illustrates a converter 100'' embodying a further aspect of the invention. Converter 100'', that includes a push-pull stage, generates a 24 volt output voltage $V_{24}$ by DC-to-DC converting a 12 volt battery input voltage $V_B$. Converter 100'' of FIG. 5 may be used in, for example, a portable color television receiver having a ten inch picture tube of the type 250ATB22, made by Hitachi Co., and not shown in the figures. Additionally, converter 100'' of FIG. 5 may provide a 15 volt standby supply voltage $V_{SB}$ and a 220 volt supply voltage $V_{DG}$. Voltage $V_{DG}$ may be used for energizing a resonance degaussing circuit, not shown in the figures.

In converter 100'', the drain electrodes of MOSFET transistors $Q_{10}$ and $Q_{20}$ are coupled to end terminals 90 and 91, respectively, of a primary winding $T_{10a}$ of a chopper transformer $T_{10}$. A terminal 92 of winding $T_{10a}$, located intermediate terminals 90 and 91, is coupled to battery voltage $V_B$. An oscillator $U_1$ generates signals at opposite phases that are coupled via a drive circuit $U_2$ to form oppositely phased signals $V_{2a}$ and $V_{2b}$, respectively. Signals $V_{2a}$ and $V_{2b}$ coupled, respectively, to the gate electrodes of transistors $Q_{10}$ and $Q_{20}$ via resistors $R_3$ and $R_4$ cause transistors $Q_{10}$ and $Q_{20}$ to operate in a push-pull manner.

A drain current $i_{10}$ of transistor $Q_{10}$ is sampled by a diode $D_{20}$ in a manner that is analagous to that done by diode $D_2'$ of FIG. 3. Consequently, a voltage $V_{S10}$ of FIG. 5 is formed in a similar manner to the way signal $V_S'$ of FIG. 3 is formed. Similarly, a drain current $i_{20}$ of transistor $Q_{20}$ of FIG. 5 is sampled by a diode $D_{30}$ to form a voltage $V_{S20}$. Voltages $V_{S10}$ and $V_{S20}$, that are alternately developed, are applied to respective resistors $R_6$ and $R_7$. Consequently, a signal $V_{SUM}$ at a junction terminal A of resistors $R_6$ and $R_7$ is formed. Signal $V_{SUM}$ is developed across a resistor R18 and an integrating capacitor C6 and coupled to an inverting input terminal of a comparator $U_{3C}$. Diode $D_{20}$, for example, prevents voltage $V_{90}$ across transistor $Q_{10}$ from affecting signal $V_{SUM}$ when transistor $Q_{10}$ is nonconductive.

Should a fault condition occur that causes any of currents $i_{10}$ and $i_{20}$ to exceed a predetermined level, signal $V_{SUM}$ will exceed a reference voltage $V_{RF}$, developed across a diode $D_6$ at a noninverting input terminal of comparator $U_{3C}$. Consequently, a signal $V_0$ will be generated at an output terminal of comparator $U_{3C}$. Signal $V_0$ is coupled via a noninverting input terminal of a comparator $U_{3B}$ having an output terminal that feeds an inverting input terminal of a comparator $U_{3A}$. As a result Signal $V_0$ occurs when signal $V_{SUM}$ is greater than reference voltage $V_{RF}$. When signal $V_0$ is generated, a signal INHIBIT at a first or HIGH, logic level is generated at an output terminal of comparator $U_{3A}$. Signal INHIBIT at the first logic level causes the output signals of oscillator $U_1$ to remain at zero volts. The result is that each of signals $V_{2a}$ and $V_{2b}$ becomes zero. Therefore, the switching operation in transistors $Q_{10}$ and $Q_{20}$ ceases and transistors $Q_{10}$ and $Q_{20}$ are prevented from being turned on. Therefore, signal $V_{SUM}$ becomes zero and signal $V_0$ returns to its normal operation level.

Comparator $U_{3B}$ operates as a time-out timer. Once its output signal $V_{3BOUT}$ changes, signal $V_{3BOUT}$ is prevented from immediately returning to its normal operation level. Signal $V_{3BOUT}$ is so prevented until a shut-down period of, illustratively, 150 milliseconds has elapsed from the time signal $V_0$ returns to its normal operation level. The 150 millisecond minimum delay is determined by the time constant that is associated with a capacitor $C_5$, coupled to an inverting input terminal of comparator $V_{3B}$, as described below.

During normal operation of converter 100", signal $V_{SUM}$ is smaller than voltage $V_{RF}$. An output terminal of comparator $U_{3C}$, pin number 13, represents a high impedance that is formed at an open collector transistor, not shown in the figures. An output terminal of comparator $U_{3B}$, pin number 14, also represents a high impedance. Capacitor $C_5$ is charged to a voltage that is determined by resistors $R_{15}$, $R_{14}$, $R_{13}$ and $R_{16}$ that form a voltage divider.

When signal INHIBIT at the output terminal of comparator $U_{3A}$ is low, signal INHIBIT enables oscillator $U_1$. When an overload condition occurs, signal $V_{SUM}$ increases above the level of voltage $V_{RF}$ and triggers comparators $U_{3C}$ and $U_{3B}$. Their output terminals switch to the LOW state that is approximately at ground potential and drive comparator $U_{3A}$ output signal INHIBIT to the HIGH state level which disables oscillator $U_1$. As a result of converter 100" being disabled, signal $V_{SUM}$ decreases to a value that is below that of voltage $V_{RF}$ and comparator $U_{3C}$ output terminal switches to a high impedance. Because of the feedback provided by resistor $R_{13}$, comparator $U_{3B}$ output signal $V_{3BOUT}$ remains at the LOW state until capacitor $C_5$ discharges through resistor $R_{14}$ to a voltage that is lower than the voltage of signal $V_0$. Signal $V_0$ is developed at the noninverting input terminal of comparator $U_{3B}$. Consequently, comparator $U_{3B}$ output terminal switches to the high impedance and capacitor $C_5$ begins charging via resistors $R_{16}$, $R_{13}$ and $R_{14}$. When the voltage at the inverting input terminal of comparator $U_{3A}$, pin number 6, has increased above the voltage at the noninverting input terminal, pin number 7, comparator $U_{3A}$ output signal INHIBIT switches to the LOW state and again enables oscillator $U_1$. Therefore, the generation of signals $V_{2a}$ and $V_{2b}$ is resumed.

The time interval between the triggering that is caused by signal $V_{SUM}$ and the time that the switching operation of transistors $Q_{10}$ and $Q_{20}$ ceases is, advantageously, very short, approximately 1 microsecond. After the switching operation in transistors $Q_{10}$ and $Q_{20}$ stops, the switching operation, cannot immediately resume, as indicated before. The resumption of the switching operation may occur, at the earliest, after the 150 millisecond shut-down period has elapsed, as described before. Thus, transistors $Q_{10}$ and $Q_{20}$ can recover or cool down from the over-current condition before they can be turned on again.

In the circuit of FIG. 5, the triggering level occurs when signal $V_{SUM}$ exceeds approximately 0.7 volts that is determined by the forward voltage of diode $D_6$. Such level corresponds to voltages $V_{90}$ and $V_{91}$ each being at approximately 0.8 volts. In each of MOSFET transistors $Q_{10}$ and $Q_{20}$ of FIG. 5, the "on" resistance that occurs when the transistor is fully turned on may be approximately 0.12 ohms. Thus, shut-down of converter 100" when the current $i_{10}$ or $i_{20}$ exceeds approximately 6.5 amperes. The protection threshold voltage or current may be controlled by changing the value of resistor $R_{18}$.

Voltage comparator $U_{3A}$ receives, via its noninverting input terminal, a reference voltage developed in a zener diode $D_{16}$. When battery voltage $V_B$ falls below, for example, 11 volts, signal INHIBIT is generated because signal $U_{3BOUT}$ at the inverting input terminal of comparator $U_{3A}$ becomes smaller than the voltage at the noninverting input terminal $V_{RF}$. Therefore, the switching operation of transistors $Q_{10}$ and $Q_{20}$ ceases. Consequently, further discharging the battery is prevented.

The positive portions of voltages $V_{90}$ and $V_{91}$ are coupled to a charge storage capacitor $C_{10}$ via diodes $D_4$ and $D_5$, respectively. Capacitor $C_{10}$ is thereby charged to approximately 24 volts. A voltage that is developed across a secondary winding $T_{10b}$ of transformer $T_{10}$ is rectified and doubled in a voltage doubler 66 comprising a capacitor $C_{12}$, a diode $D_8$, a diode $D_7$ and a capacitor $C_{13}$. Voltage doubler 66 produces a voltage $V_{DG}$ that may be used as the supply voltage in a resonant degaussing circuit, not illustrated.

Voltage $V_{DG}$ is also coupled to the gate of a MOSFET transistor $Q_{30}$ to turn on the transistor. Capacitor $C_{10}$ is coupled via MOSFET transistor $Q_{30}$ to a terminal 77 to develop voltage $V_{24}$ at terminal 77 when the switching operation is normal. When the switching operation ceases, as a result of, for example, an over-current condition, transistor $Q_{30}$ becomes immediately nonconductive. When transistor $Q_{30}$ becomes nonconductive, the transistor isolates terminal 77 from storage capacitor $C_{10}$. In this way, transistor $Q_{30}$, advantageously, immediately decouples power to the load.

What is claimed:

1. A fault detection and protection apparatus in a switching power supply, comprising:
   a source of an input supply voltage;
   a first switching power transistor having first and second main current conducting electrodes and a control electrode;
   a source of a first control signal at a given frequency that is coupled to said control electrode of said first switching power transistor for causing, during normal operation, said first switching transistor to operate at a switching frequency determined in accordance with said given frequency;
   a utilization circuit including an impedance coupled to said input supply voltage and to said first main current conducting electrode for developing an output supply voltage in said utilization circuit, said impedance forming a current path to a switched main current that flows in said first switching power transistor to develop a first current sensing signal at a frequency determined in accordance with said given frequency, and that is developed between said first and second main current conducting electrodes of said first switching power transistor when said first switching power transistor is conductive, said first current sensing signal being indicative of a level of said main current when said first switching power transistor is conductive;
   first means responsive to said first control signal and to said first current sensing signal and having an input terminal that is coupled to said first main current conducting electrode for generating at an output terminal a first portion of a second current sensing signal that is indicative of said level of said main current when said first switching power transistor is at a conductive state, and for decoupling said output terminal from said power transistor when said first switching power transistor is at a nonconductive state to prevent a voltage that is developed at said first main current conducting electrode of said first switching power transistor when said power transistor is nonconductive from having a substantial contribution to an amplitude of said second current sensing signal; and second means responsive to said second current sensing signal for generating a second control signal, when a magnitude of said first portion of said second current sensing signal is outside a normal operation range indicating an occurrence of a fault condition in said power supply, said second control signal being coupled to said control electrode of said first switching power transistor for preventing said first switching power transistor from further conducting.

2. An apparatus according to claim 1 wherein said first switching power transistor comprises a MOSFET transistor that is turned-on during at least a portion of each cycle of said first control signal.

3. An apparatus according to claim 1 wherein said second means generates said second control signal when said current that flows in said first switching power transistor is greater than a corresponding predetermined threshold level.

4. An apparatus according to claim 1 wherein said utilization circuit comprises a power supply stage that includes a winding of a flyback transformer for generating said output supply voltage in said winding of said transformer, and a rectifier that is coupled to said winding to develop a DC second output supply voltage that is coupled to a circuit stage of a television apparatus to provide power thereto.

5. An apparatus according to claim 1 wherein said first means comprises a diode having a first terminal that is coupled to said first main current conducting electrode of said first switching power transistor for developing said second current sensing signal at a second terminal of said diode such that, when said first switching power transistor is conductive, said diode is forward biased and when said first switching power transistor is nonconductive, said first current sensing signal that is developed at said first main current conducting electrode of said first switching power transistor back biases said diode to decouple said first main current conducting electrode of said first switching power transistor from said second terminal of said diode.

6. An apparatus according to claim 1 wherein first current sensing signal is developed in an internal resistance of said first switching power transistor when said first switching power transistor is conductive.

7. An apparatus according to claim 1 wherein said first control signal generating means is responsive to said second current sensing signal for varying said given frequency of said first control signal in accordance with a magnitude of said second current sensing signal.

8. An apparatus according to claim 1 wherein said impedance comprises, a first transformer winding having a first terminal that is coupled to said first main current conducting electrode of said first switching power transistor, a second switching power transistor having a first main current conducting electrode that is coupled to a second terminal of said first transformer winding that is remote from said first switching power transistor for conducting a second switching current in said second switching power transistor and having a control electrode that is responsive to a control signal at a frequency that is related to that of said first control signal such that said first and second switching power transistors operate in a push-pull manner, and wherein said second means is coupled to said first main current conducting electrodes of said first and second switching power transistors for generating said second current sensing signal that is indicative of an overcurrent condition in either one of said first and second switching power transistors.

9. An apparatus according to claim 8 wherein said second means comprises first and second diodes, said first diode having a first terminal that is coupled to said first main current conducting electrode of said first switching power transistor and said second diode having a first terminal that is coupled to said first main current conducting electrode of said second switching power transistor and combining means coupled to said diodes for developing said second current sensing signal in accordance with a signal that is developed at a second terminal of said first diode and in accordance with a signal that is developed at a second terminal of said second diode.

10. An apparatus according to claim 9 wherein said combining means comprises, a resistance having a first terminal that is coupled to said first diode and a second terminal that is coupled to said second diode such that said second current sensing signal is developed at a terminal of said first resistance that is coupled between said first and second terminals of said resistance.

11. An apparatus according to claim 8 further comprising a rectifier arrangement coupled to said first winding for generating a first DC output voltage in a capacitor and a switching third means responsive to a signal that is developed at a second winding of said transformer for coupling said first DC output voltage to an output terminal of said third means during normal operation and for fast decoupling said output terminal from said capacitor when a fault condition occurs.

12. An apparatus according to claim 1 further comprising a delay means responsive to said second current sensing signal for generating a signal that enables resumption of the switching operation in said first switching power transistor only after a period having at least a predetermined length has elapsed following the occurrence of said second control signal that is sufficient to prevent harm to said first switching power transistor.

13. An apparatus according to claim 1 wherein said second means generates said second control signal when said input supply voltage is lower than a predetermined level.

14. An apparatus according to claim 1 wherein said first portion of said second current sensing signal is an analog signal.

15. An apparatus according to claim 1 wherein substantially outside an interval when said first switching power transistor is conductive said first means operates as a nonconductive series switch that is interposed between said output terminal and said first power transistor.

16. A fault detection and protection arrangement of a power supply apparatus, comprising:
a source of an input supply voltage;
a first switching power transistor having first and second main current conducting electrodes and a control electrode;
a source of a first signal at a given frequency coupled to said control electrode of said first switching power transistor for causing, during normal operation, said first switching transistor to operate at a switching frequency determined in accordance with said given frequency;

a utilization circuit including an impedance coupled to said input supply voltage and to said first main current conducting electrode for developing an output supply in said utilization circuit, said impedance forming a current path to a switched main current that flows in said first switching power transistor for developing a second signal at a frequency that corresponds with that of said first control signal and that is developed between said first and second main current conducting electrodes of said first switching power transistor, said second signal being indicative of a level of said switched main current;

a second impedance having a first terminal that is coupled to said first main current conducting electrode of said first switching power transistor;

a second switching transistor having a control electrode that is coupled to said first signal and a main current conducting electrode that is coupled to a second terminal of said second impedance for developing a third signal at said main current conducting electrode of said second switching transistor when said first switching power transistor is conductive that is indicative of an amplitude of said switched main current, and when said first switching power transistor is nonconductive, said second switching transistor causes said third signal to be substantially smaller in value than when said first switching power transistor is conductive; and means responsive to said third signal for generating a control signal that is coupled to said control electrode of said first switching power transistor, said control signal causing a reduction in said current that flows in said first switching power transistor when said third signal exceeds a predetermined magnitude.

17. A fault detection and protection apparatus in a switching power supply, comprising:

a source of an input supply voltage;

a first switching power transistor having first and second main current conducting electrodes and a control electrode;

a source of a first signal at a given frequency that is coupled to said control electrode of said first switching power transistor for causing, during normal operation, said first switching transistor to operate at a switching frequency that is determined in accordance with said given frequency;

a first transformer winding having a first terminal that is coupled to said first main current conducting electrode of said first switching power transistor;

a second switching power transistor having a first main current conducting electrode that is coupled to a second terminal of said first transformer winding that is remote from said first switching power transistor for conducting a second switching current in said second switching power transistor and having a control electrode that is responsive to a signal at a frequency that is related to that of said first signal such that said first and second switching power transistors operate in a push-pull manner;

means coupled to said first main current conducting electrodes of said first and second switching power transistors for generating a third signal during first and second portions of a given period of said first signal that is obtained from voltages developed in respective internal impedances of said first and second switching power transistors, and that is proportional, during said first and second portions, to said first and second switching currents that flow therein, respectively; and means responsive to said third signal for generating a control signal when a magnitude of either one of said first and second switching currents is outside a normal operation range, that is indicative of an occurrence of a fault condition in said power supply, said control signal being coupled to said control electrode of at least one of said first and second switching power transistors for providing protection against said fault condition.

18. A fault detection and protection apparatus in a switching power supply, comprising:

a source of an input supply voltage;

a first switching power transistor having first and second main current conducting electrodes and a control electrode;

a source of a first control signal at a given frequency that is coupled to said control electrode of said first switching power transistor for causing, during normal operation, said first switching transistor to operate at a switching frequency determined in accordance with said given frequency;

a utilization circuit including an impedance coupled to said input supply voltage and to said first main current conducting electrode for developing an output supply voltage in said utilization circuit, said impedance forming a current path to a switched main current that flows in said first switching power transistor to develop a first current sensing signal at a frequency determined in accordance with said given frequency, and that is developed between said first and second main current conducting electrodes of said first switching power transistor when said first switching power transistor is conductive, said first current sensing signal being indicative of a level of said main current when said first switching power transistor is conductive;

first means responsive to said first control signal and to said first current sensing signal and having an input terminal that is coupled to said first main current conducting electrode for generating at an output terminal a first portion of a second current sensing signal that is indicative of said level of said main current when said first switching power transistor is at a conductive state, and for decoupling said output terminal from said first switching power transistor when said first switching power transistor is at a nonconductive state to prevent a voltage that is developed at said first main current conducting electrode of said first switching power transistor when said power transistor is nonconductive from having a substantial contribution to an amplitude of said second current sensing signal; and second means responsive to said second current sensing signal for generating a second control signal, when a magnitude of said first portion of said second current sensing signal is outside a normal operation range indicating an occurrence of a fault condition in said power supply, said second control signal being coupled to said control electrode of said first switching power transistor for preventing said first switching power transistor from further conducting, wherein said first means comprises a second switching transistor having a control electrode that is coupled to said first control signal and a main current conducting electrode that is coupled via a second impedance to said first main current conducting electrode of said first switching power transistor for developing said second current sensing signal at said main current conducting electrode of said second switching transistor such that when said first switching power transistor is conductive said second switching transistor is nonconductive, and vice versa.

19. An apparatus according to claim 18 wherein said second switching transistor comprises an FET transistor operating as a shunt switch.

20. An apparatus according to claim 18 wherein signals that are developed at said control electrodes of said transistors are at the same phase.

21. An apparatus according to claim 18 wherein said second impedance and said second switching transistor form an attenuator that attenuates a portion of said first current sensing signal that occurs when said second switching transistor is conductive.

* * * * *